United States Patent [19]

Dodds et al.

[11] Patent Number: 5,077,726
[45] Date of Patent: Dec. 31, 1991

[54] OPTICAL DISC CARTRIDGE WITH A FLEXIBLE STORAGE MEDIUM

[75] Inventors: David R. Dodds; K. John Stahl, both of Boulder, Colo.

[73] Assignee: Bernoulli Optical Systems Company, Boulder, Colo.

[21] Appl. No.: 333,447

[22] Filed: Apr. 5, 1989

[51] Int. Cl.⁵ ............................................. G11B 23/03
[52] U.S. Cl. ..................................... 369/291; 369/266; 360/133; 360/99.04; 360/102
[58] Field of Search ................. 360/86, 97.01, 97.02, 360/97.03, 97.04, 99.01, 99.02, 99.04, 99.08, 99.12, 102, 103, 104, 106, 122, 133, 135, 137; 369/261, 266, 291

[56] References Cited

U.S. PATENT DOCUMENTS

| | | | |
|---|---|---|---|
| 3,772,665 | 11/1973 | Hertrick. | |
| 3,947,886 | 3/1976 | Heidecker. | |
| 4,074,330 | 2/1978 | Norton et al.. | |
| 4,376,960 | 3/1983 | Karol | 360/99.01 |
| 4,414,592 | 11/1983 | Losee et al. | 360/102 |
| 4,419,704 | 12/1983 | Radman et al. | 360/102 |
| 4,445,155 | 4/1984 | Takahashi et al. | 360/99.04 |
| 4,734,989 | 5/1988 | Bauck et al. | 360/133 |
| 4,743,989 | 5/1988 | Bauck et al. | 360/97.04 X |
| 4,768,124 | 8/1988 | Bauck et al. | 360/99.02 X |
| 4,769,733 | 9/1988 | Freeman et al. | 360/133 |
| 4,794,480 | 12/1988 | Jones et al. | 360/99.04 |
| 4,969,061 | 11/1990 | Patterson et al. | 360/97.20 X |

*Primary Examiner*—Paul Ip
*Attorney, Agent, or Firm*—Woodcock Washburn Kurtz Mackiewicz & Norris

[57] ABSTRACT

An optical disc cartridge with a flexible optical storage medium, stabilized during rotation by a Bernoulli surface, is described. A flexible optical disc having an active layer capable of storing information is mounted within a rigid disc cartridge. A Bernoulli surface is provided on an inside face of the disc cartridge, in close proximity to the flexible disc, to thereby stabilize the flexible disc during rotation. The disc is rotated in order to access locations thereon during information storage and retrieval. Additionally, optical access to these locations during information storage and retrieval is also provided by the stabilizing Bernoulli surface.

8 Claims, 4 Drawing Sheets

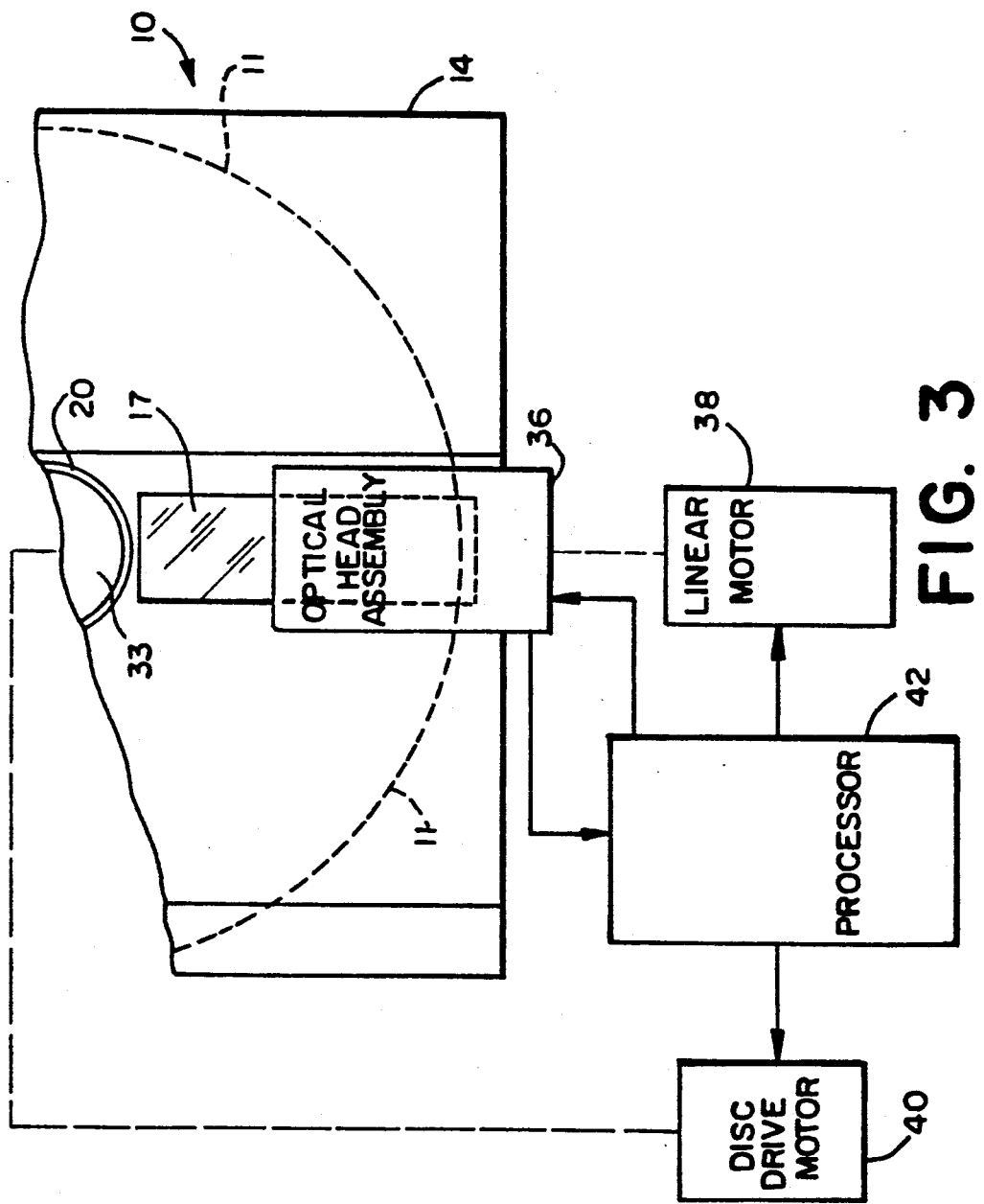

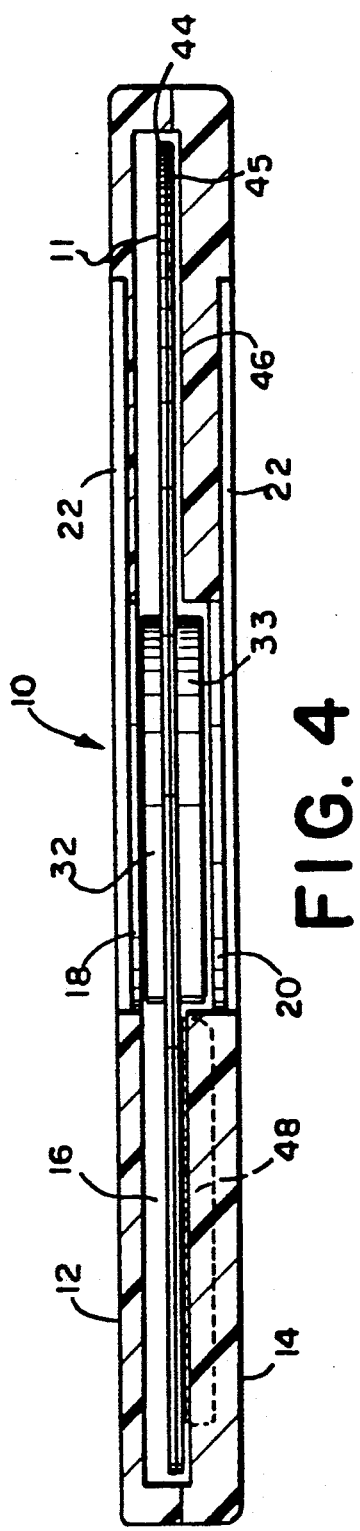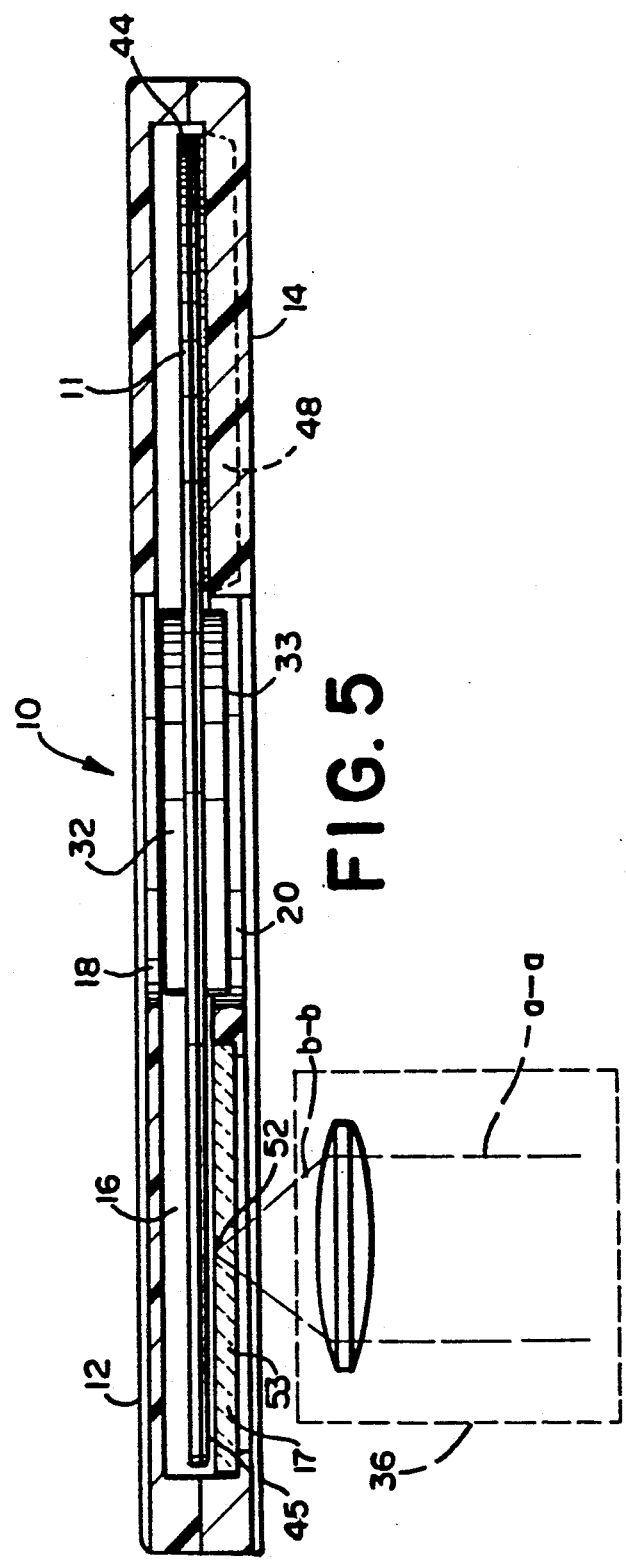

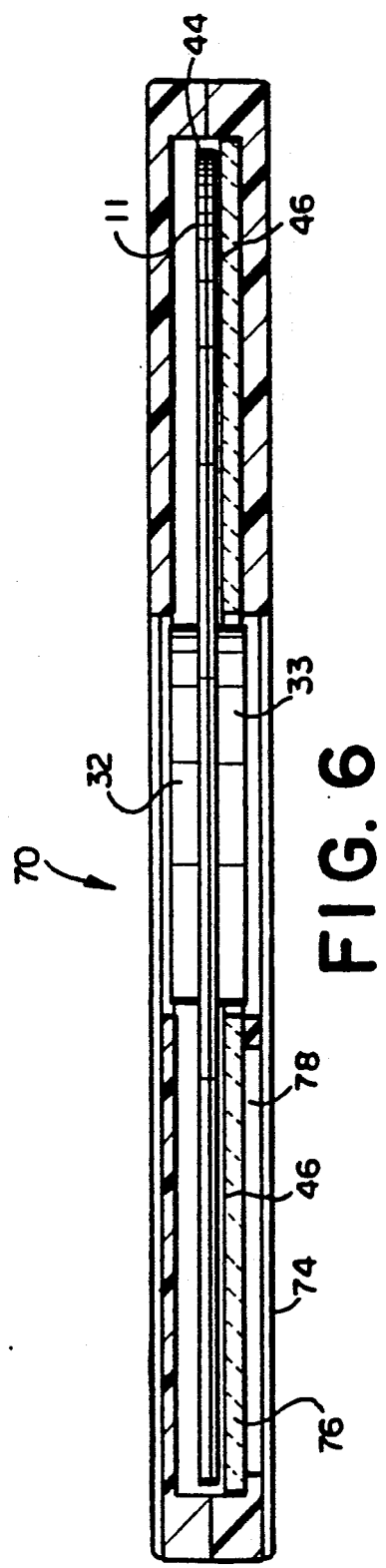

OPTICAL DISC CARTRIDGE WITH A FLEXIBLE STORAGE MEDIUM

Related Applications

This patent application is related to U.S. Pat. application Ser. No. 167,652 filed Mar. 14, 1988 and to U.S. Pat. application Ser. No. 167,659, also filed Mar. 14, 1988.

BACKGROUND OF THE INVENTION

The present invention relates to the field of optical information storage and retrieval systems and, more particularly, to an optical disc cartridge with a flexible storage medium stabilized during rotation by a Bernoulli surface.

The present emphasis in the development of information storage systems is to increase the amount of information stored in so-called "desk-top" sized computer memory system. Desk-top sized memory systems which incorporate magnetically recorded hard disc storage media, such as that used in Winchester-type disc drive memory systems, currently have the capacity to store upwards of 200 megabytes of magnetically recorded information. The problem with such memory systems is that, by necessity, the hard disc storage medium is permanently mounted into the computer. Since the storage medium is not easily removable, the user is restricted to utilize only those portions of the hard disc that remain available for information storage at the time of use. Accordingly, information systems employing magnetically-recorded hard disc storage media are not perceived as potential solutions to the problem of increasing information storage capacity.

Unlike hard disc systems, the so-called "floppy disc" memory storage systems use flexible magnetic discs, each having a diameter of either 5.25 inches or 3.50 inches, as the storage media. These floppy discs can be easily removed and/or interchanged. However, the magnetically recorded information storage capacity of a single floppy disc has not yet reached a level equal to that of the hard disc. A single floppy disc can only store approximately 1 to 2 megabytes of magnetically recorded information. Nonetheless, floppy discs are frequently used as a magnetic storage medium despite their storage limitations primarily because of their portability and low cost.

Several magnetic disc storage products have been recently introduced which attempt to bridge this gap between the capacities of magnetic hard discs and magnetic flexible discs. The primary goal of these products has been to provide a removable disc package which has more capacity than a single floppy disc. Additionally, another goal of these products has been to provide a high performance disc drive which increases the data transfer rate and reduces the disc access time as compared to the corresponding characteristics of a conventional floppy drive. Two of the techniques which have been used to design these intermediate products are: 1) to design the hard disc packaging which can be removed from the disc drive; and 2) the introduction of features into floppy discs which allow the disks to operate as a rigid disc.

It is well known that the space between a magnetic disc and its transducer is critical for proper data storage and retrieval. Maintaining this critical gap is a primary engineering problem which must be addressed when designing a product which uses flexible media and performs similar to a rigid disc drive. A technique which has been used to flatten and stabilize the floppy disc during the read/write operation, in order to facilitate control of the gap, is to rotate the disc at high speeds in close proximity to a flat surface sometimes called a Bernoulli plate. In such a configuration, an air bearing is formed between the Bernoulli plate and the floppy disc so that a fixed gap between the recording surface of the floppy disc and the Bernoulli plate is created and maintained. When the gap between the disc and the plate has been stabilized sufficiently, the gap between the disc and the transducer can similarly be reduced and performance of the disc drive is enhanced.

In order for the Bernoulli plate to be effective, however, the surface of the plate must be flat and rigid, especially in the region of the plate where the transducer is positioned. For this reason, most applications of this technology have fixed the Bernoulli plate completely or partially within the disc drive. See U.S. Pat. No. 3,947,886 issued to Heidecker and U.S. Pat. No. 4,074,330 issued to Norton et al. In an alternative configuration, however, the Bernoulli surface need not be contained in the disc drive to provide sufficient stabilization for the media; it may be enclosed within the cartridge, itself. Rotating a magnetic disc in proximity to a surface inside a disc cartridge is not new in the art. For example, see U.S. Pat. No. 3,772,665 issued to Hertrich. U.S. Pat. No. 4,734,989, issued to Bauck, et al, discloses the use of a Bernoulli surface placed within a disc cartridge proximate a flexible magnetic disc in order to stabilize the magnetic disc during rotation. However, Bauck, et al, includes a slot-shaped opening in the stabilizing Bernoulli surface in order to permit information transfer from the magnetic disc to the transducer. Thus, in such a design, the effects of Bernoulli stabilization on the magnetic disc are weakest at the point where precise spacing is most critical—the physical location on the magnetic disc where information storage and/or retrieval is occurring.

An additional technology which attempts to bridge the gap between the utility and removability of magnetic floppy discs and the performance of magnetic hard discs has been the advent of optical information storage systems. Optical storage systems have become increasingly popular in recent years. In general, an optical disc storage system operates by rotating an optical disc around a central axis. A light beam is projected onto the surface of the disc by an optical head assembly which typically includes a light source, a collimating lens, a reflecting mirror and a projecting lens. During read operations, or in a so-called worm (write once, read many times) drive, light is projected by the optical head assembly onto a specific location on the optical disc. Modulated reflected light detected by a photodetector and supplied to a data processor for producing information signals.

In an optical system during write operations, the light intensity is modulated by the optical head. The optical disc contains an active layer which is sensitive to the intensity of incident light. Consequently, the light intensity produced by the optical head is increased so as to cause a change in this active layer at the point o the disc at which the light is focused. This change can be sensed during writing itself or can be detected at a later time during a read operation as described above.

Information storage systems which can be accessed through optical devices such as the one described above have recently received serious attention due to their potential capacity to store substantial amounts of data, i.e. on the order of 400 to 800 megabytes of information, utilizing the same physically sized devices that are currently in use. This capacity represents an increase of a factor of 4 over that currently available in magnetically recorded hard discs and a factor of 400 over floppy disc storage systems.

Most all optical discs designed for minicomputers an microcomputers, which are presently in commercial operation, are comprised of a rigid plastic or glass substrate with a thin, optically active layer deposited thereon for the storage of information. Such a design has proven desirable for several reasons. First, in order to maintain a relatively constant distance between the active layer and the optical head to ensure proper transfer of information, a rigid optical disc, once properly positioned within the disc drive, will spin in a predetermined and consistent fashion. Unfortunately, the relatively high cost of manufacturing rigid optical discs has inhibited widespread commercial acceptance of optical information storage systems. However, the storage media used in such optical systems need not be rigid. The media can be of a form similar to that of a floppy disc, that is, a media which is both easily removable and more cost effective.

SUMMARY OF THE INVENTION

It is an object of this invention to provide an optical information storage system which utilizes a flexible substrate coated with the active layer of the optical storage media.

It is another object of this invention to provide a low cost disc cartridge containing a flexible media substrate, upon which the active layer of the media is deposited. This disc cartridge is designed to be fully compatible with optical information storage systems which employ rigid optical discs.

It is yet another object of this invention to provide aerodynamic stability for the flexible optical storage media by means of a Bernoulli surface contained within the disc cartridge. Upon rotation of the media, said Bernoulli surface creates an air bearing and thereby maintains a constant distance between the flexible substrate and said Bernoulli surface.

Still yet another object of this invention is to provide a transparent window in the disc cartridge for allowing the light projected by an optical head assembly to be focussed onto locations of said flexible optical storage media when information storage and retrieval is desired.

Finally, yet another object of this invention is to provide a transparent window in the disc cartridge which allows the projected light to be focussed onto locations of said flexible optical storage media and which also contributes to the aerodynamic stability of the flexible optical storage media.

In accordance with the present invention, a flexible optical disc having an active layer capable of storing information is mounted within a disc cartridge. This cartridge is compatible with a disc drive designed for use with a rigid disc. A Bernoulli surface is provided on an inside face of the disc cartridge in close proximity to the flexible disc. During operation of an optical information storage system, the flexible disc is rotated to provide access to locations thereon for the purpose of information storage and retrieval. The Bernoulli surface aerodynamically stabilizes the rotating flexible disc by creating an air bearing. This air bearing maintains a constant distance between an optical head assembly, included as part of the optical information storage system, and the locations on the flexible disc where said optical head assembly projects light for the purposes of information storage and/or retrieval. The Bernoulli surface is provided with at least one transparent window which allows light transmission between the data locations on the flexible disc and the optical sensor and which contributes to the aerodynamic stability of the flexible disc. In one embodiment of the invention, the Bernoulli surface may be entirely comprised of a transparent material. In yet another embodiment of the invention, the Bernoulli surface may be comprised of an opaque surface having an opening in which a transparent material is inserted.

The present invention will be better understood, and its numerous objects and advantages will become apparent to those skilled in the art by reference to the following detailed description of the invention when taken in conjunction with the following drawings.

BRIEF DESCRIPTION OF THE DRAWINGS

FIG. 3 is a block diagram of an optical information storage and retrieval systems for use with the optical disc cartridge of FIGS. 1 and 2;

FIG. 4 is a cross-sectional view taken along line 4—4 of FIG. 1; and

FIG. 5 is a cross-sectional view taken along line 5—5 of FIG. 1.

DESCRIPTION OF THE PREFERRED EMBODIMENT

Figure 1:
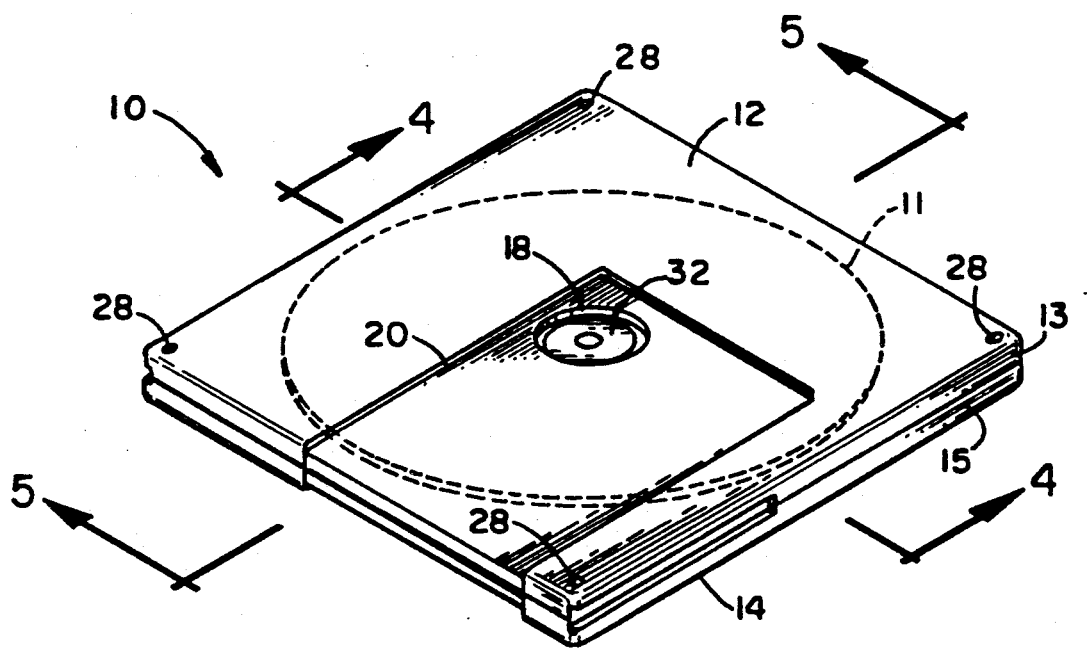
FIG. 1 is a top view of an optical disc cartridge with a flexible storage medium constructed in accordance with the principles of the present invention.

An optical disc cartridge 10 having a flexible storage medium disc 11 constructed in accordance with the principles of the present invention may be seen in FIG. 1. Disc cartridge 10 is comprised of a top portion 12 having integrally formed side walls 13 and a similarly sized and shaped bottom portion 14 having integrally formed side walls 15 of dimensions approximately equivalent to side walls 13. Disc cartridge 10 is constructed by joining top portion 1 and bottom portion 14 together by conventional means to thereby define an interior chamber 16, shown in FIGS. 4 and 5.

Figure 2:
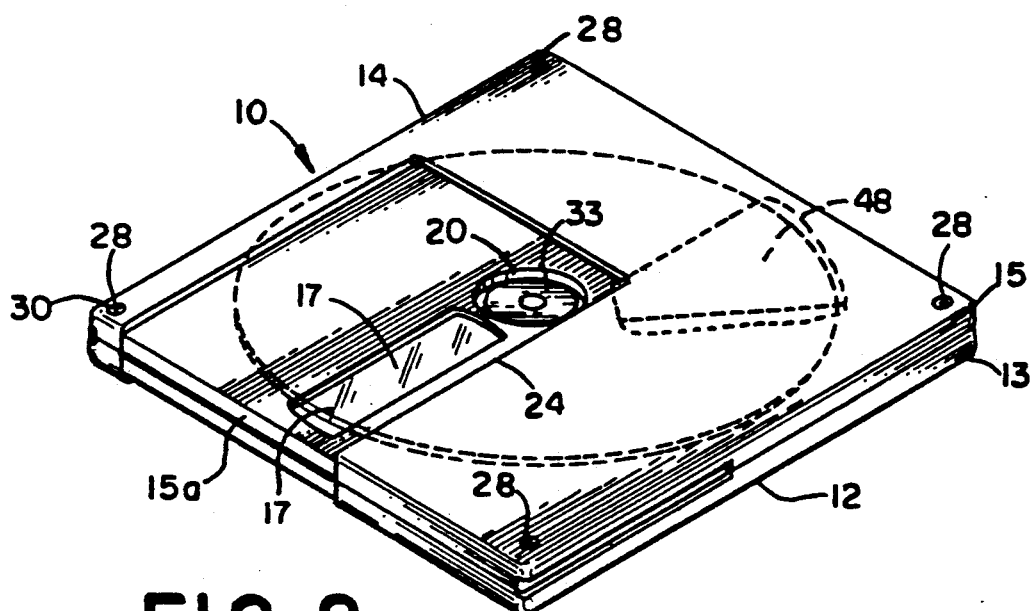
FIG. 2 is a bottom view of the optical disc cartridge of FIG. 1.

Cartridge 10 is generally comprised of an opaque material such as an opaque plastic, and bottom portion 14, shown in greater detail in FIG. 2, is provided with a transparent window 17 extending from the leading edge of bottom side 14 to a point short of the center of cartridge 10 to permit information transfer between optical disc 11 and an optical head assembly. In an alternative configuration, cartridge 10 or bottom side 14 may be constructed entirely or in part of a transparent material which would provide for the function of window 17. Preferably, the transparent window 17 should be glass, clear plastic or a similar material.

Top side 12 and bottom side 14 ar also provided with central openings 18 and 20, respectively, to permit engagement of disc 11 with drive motor 40, shown in FIG. 3 which will provide for rotation of disc 11 within cartridge 10 such that information stored at various locations may be accessed through transparent window 17. In alternative embodiments, top side 12 and bottom side 14 may not need both openings 18 and 20, respectively, as disc engagement may be accomplished with only one opening, either 18 or 20.

As may also be seen by reference to FIGS. 1 and 2, transparent window 17 and openings 18 and 20 ar located in reduced height portions 22 24 of top and bottom portions 12 and 14 in which a slidable cover (not shown) may be utilized to protect disc 11, and disc hubs 32 and 33 from contaminants or damage while not in use. Reduced height portions 20 and 26 may not be required in other embodiments or may provide for a slidable cover (not shown) which will only cover one disc hub 32 or 33, not both, and window 11.

The operation of optical disc cartridge 10 in a optical information storage and retrieval system may now be seen by reference to FIG. 3. Disc drive motor 40 causes flexible disc 11 to rotate upon receipt of an enabling signal from processor 42 by the disc drive motor 40. As disc 11 rotates, processor 42 provides a enabling signal to actuator motor 38 causing optical head assembly 36 to move radially across the surface of disc 34. During a read or access operation, optical head assembly 36 illuminates a limited area on disc 34 with a beam of light through transparent window 17. Information stored on disc 34 modulates the light reflected from its surface. The reflected light is then detected and converted into an electrical signal by optical head assembly 36 and such signal is provided to processor 42.

During a write operation, processor 42 causes disc 11 to spin. Similarly, an enabling signal from processor 42 causes linear motor 38 to move optical head assembly 36 radially across disc 34 to a desired location. Optical head assembly 36 then projects a light beam through transparent window 17 which is modulated from low to high intensity by an electrical signal from processor 42 causing information to be written onto the surface of disc 11. There are several known methods for achieving these read and write operation and the present invention is not limited to use of any particular method.

The optical disc cartridge 10, which fits into a disc drive designed for use with a rigid disc cartridge and which utilizes a stabilized flexible optical disc 34 for information storage and retrieval, the subject of the present invention, may now be seen in greater detail in FIG. 4. As previously described, disc cartridge 10 is comprised of top portion 12 and bottom portion 14, each with respective integral sides 13 and 15, respectively, joined together by conventional means to define chamber 16 therebetween. Flexible optical disc 11 is located within chamber 16. While numerous flexible optical disc compositions may be satisfactorily utilized in accordance with the invention described herein, in the preferred embodiment, the substrate is comprised of a flexible optical media such as a flexible plastic, e.g. a polyester film. Flexible substrate optical media 44 has at least one active layer 45, i.e. a layer capable of storing information in response to a modulated light transmission. In the preferred embodiment of the present invention, optical disc 11 having a flexible substrate 44 with an active layer 45 disposed on a single side is described. However, in alternative configurations, flexible substrate 44 may be provided with a second active layer disposed on its other side without departing from the concepts and principles of the present invention.

In such a two-sided modification of the invention, top portion 14 would also be provided with a transparent window of a shape and composition similar to that of transparent window 17. This additional window thus enables information storage on and retrieval from both sides of the optical disc Such an additional transparent window may be constructed in accordance with any of the embodiments of the invention which are described herein.

Optical disc 11 also includes top hub 32 and bottom hub 33 attached thereto. Hubs 32 and 33 are provided on flexible disc 34 for engagement by a drive spindle (not shown) associated with drive motor 40 when cartridge 10 is fully inserted into an optical disc drive of conventional design. When storage to or retrieval from various locations on optical disc 11 is desired, hubs 32 and/or 33 will rotate disc 11 upon engagement of at least one of hubs by the drive spindle. The rotation of the drive spindle (not shown) by disc drive motor 40 thereby causes disc 11 to rotate.

The bottom portion 14 of disc cartridge 10 includes a Bernoulli surface 46 on its inside face which substantially inscribes a circular area therein. Bernoulli surface 46 is placed in close proximity to disc 11. Since optical disc 11 is flexible, it can bend and indeed has a natural tendency, to sag towards its circumference. However, in order to ensure the maintenance of all locations on the surface of disc 11 at a uniform distance from optical head assembly 36 during read/write operations, it is necessary that the surface of disc 34 remain planar. Further, since access to information stored on such discs is achieved by head movement across the disc surface, it is required that the surface plane be perpendicular to the axis of rotation. Consequently, as disc is rotated within chamber 16 of the present invention, flexible optical disc 11 flattens and is aerodynamically stabilized by an air bearing which is formed between disc 11 and Bernoulli surface 46. In such a manner, the gap between flexible optical disc 11 and Bernoulli surface 46 is held constant. While in the preferred embodiment, depicted in FIGS. 4 and 5, the utilization of a flat Bernoulli surface 46 is illustrated, other types of well known Bernoulli surfaces, such as a contoured surface, may be equally acceptable for use.

The surface of flexible optical disc 34 should also be provided with a wiper surface 48 (shown in FIGS. 2 and 4) to further ensure that flexible disc 34 is kept free of dust and contaminants which would interfere with information storage and/or retrieval. For example, a liner made of a material such as pellon may be placed radially along a portion of Bernoulli surface 46 to engage and clean active layer 45 as flexible disc 11 rotates.

The means by which the storage of information to and retrieval of information from optical disc 11 is accomplished may now be seen more clearly in FIG. 5. In the embodiment shown in FIG. 5, optical head assembly 36 includes a lens 50 to focus the collimated light travelling along path "a-a" and converging along path "b-b" upon a location 52 on the active layer 45 of flexible optical disc 11. Along path "b-b", the projected light travels through transparent window 17 which may be, for example, glass or clear plastic. As it is an objective of the present invention that the flexible disc optical cartridge 10 be fully compatible with information processing systems which utilize rigid optical discs for information storage and retrieval. In the preferred embodiment, the transparent window 17 should be of a thickness equal to the rigid clear substrate commonly utilized in rigid optical discs.

In general, rigid optical discs contain a rigid, clear substrate portion which overlays and supports the active layer portion of the rigid disc. Light to be projected on to this active layer must first be focused through the clear substrate portion. By requiring transparent window 11 to be of a thickness approximately equivalent to the rigid transparent substrate of rigid optical discs, full compatibility with optical information storage systems which utilize such rigid optical discs is ensured. In the preferred embodiment of the invention, transparent window 11 should be 1.2 mm thick, the thickness of the substrate of rigid discs in commercial use today.

Further, another advantage to the apparatus described herein may now be seen. In the preferred embodiment of the invention, illustrated in FIG. 5, transparent window 11 and Bernoulli surface 46 (shown in FIG. 4) correspond to a large portion of flexible disc 11, with the exception of the area on the disc immediately proximate attached hubs 52 and 5... Such a configuration provides an improved air flow and thus a greater stabilization of flexible disc 11 during rotation.

Those skilled in the art will acknowledge that numerous alternative configurations may achieved similar results. For example, Bernoulli surface 46 may be entirely comprised of a transparent material affixed to opaque bottom portion 74 of rigid disc cartridge 70, as shown in FIG. 6. Light projected by optical head 36 will pass through a rectangular opening in the bottom portion 74 through the transparent Bernoulli plate 75 and onto active layer 45.

In the preferred embodiment, illustrated in FIG. 5, Bernoulli surface 46 is integral with bottom portion 14 and is opaque. An opening 53 is provide in bottom portion 14 for inserting transparent window 22. Edges 54 of opening 53 hold transparent window 22 tightly in place. Bernoulli surface 46 (shown in FIG. 4), which is integral with bottom portion 14 of rigid disc cartridge 10, is coplanar with the inner surface of transparent window 11.

Thus, there has been described and illustrated herein, an apparatus for an optical disc cartridge which utilizes a flexible optical disc for information storage. However, those skilled in the art will recognize that many modifications and variations, in addition to those specifically mentioned, may be made in the techniques depicted above without departing substantially from the concept of the present invention. Accordingly, it should be clearly understood that the embodiment of the invention described herein is exemplary only, and is not intended as a limitation on the scope of the claims.

What is claimed is:

1. An optical read/write storage device, wherein said storage device is to be utilized with an information processing system capable of using rigid optical discs having a transparent layer of prescribed thickness, said storage device comprising:
 a flexible optical disk having an active layer capable of storing optically retrievable information, said flexible disk being rotatable during read/write operations to access locations on said flexible disk for information storage and retrieval; and
 a Bernoulli surface positioned proximate said active layer of said flexible disk, said flexible disk stabilized by said Bernoulli surface when said flexible disk is rotating, wherein said Bernoulli surface is proximate said locations on said flexible disk during information storage and retrieval, wherein a portion of said Bernoulli surface is transparent and wherein the transparent portion of said Bernoulli surface is of a thickness equal to said prescribed thickness.

2. The storage device of claim 1, further comprising hub means attached to said flexible disk for rotating said flexible disk to access said locations during information storage and retrieval.

3. The storage device of claim 1, wherein said Bernoulli surface further includes wiper means for keeping said active layer free from contaminants.

4. The storage device of claim 1, wherein the thickness of said surface is approximately 1.2 mm.

5. An optical read/write storage system, wherein said storage system is capable of using rigid optical discs having a transparent layer of prescribed thickness, said storage system comprising:
 a flexible disk having an active layer capable of storing optically retrievable information;
 rotation means for rotating said flexible disk during read/write operations to access locations on said flexible disk for information storage and retrieval;
 an optical read/write head for projecting light towards said access locations on said flexible disk and for receiving reflected light from said access locations; and
 a Bernoulli surface proximate said active layer of said flexible disk, said flexible disk stabilized by said Bernoulli surface when said flexible disk is rotating wherein said projected and reflected light passes through said Bernoulli surface to access said locations on said flexible disk during information storage and retrieval, wherein a portion of said Bernoulli surface is transparent and wherein the transparent portion of said Bernoulli surface is of a thickness equal to said prescribed thickness.

6. The storage system of claim 5, further comprising hub means attached to said flexible disk for rotating said flexible disk to access said locations during information storage and retrieval.

7. The storage system of claim 5, wherein said transparent portion is approximately 1.2 mm thick.

8. The storage system of claim 5, further comprising wiper means for keeping said active layer free from contaminants.

* * * * *